United States Patent [19]

Ilyadis

[11] Patent Number: 5,179,577
[45] Date of Patent: Jan. 12, 1993

[54] DYNAMIC THRESHOLD DATA RECEIVER FOR LOCAL AREA NETWORKS

[75] Inventor: Nicholas Ilyadis, Merrimack, N.H.

[73] Assignee: Digital Equipment Corporation, Maynard, Mass.

[21] Appl. No.: 711,635

[22] Filed: Jun. 6, 1991

[51] Int. Cl.[5] .................. H04L 25/06; H04L 25/10
[52] U.S. Cl. .................................. 375/76; 455/219; 307/358
[58] Field of Search ............... 375/76, 104, 86, 87; 455/218, 219, 212, 221; 307/350, 499, 358, 354, 352; 328/115, 135, 146, 150; 329/350; 330/254; 340/825.43

[56] References Cited

U.S. PATENT DOCUMENTS

| | | | |
|---|---|---|---|
| 3,214,700 | 10/1965 | Hook | 328/165 |
| 3,239,694 | 3/1966 | Rovell | 307/88.5 |
| 3,300,689 | 1/1967 | Beddoes | 317/148.5 |
| 3,571,730 | 3/1971 | Webb | 328/117 |
| 3,596,184 | 7/1971 | Hanus | 325/478 |
| 3,628,058 | 12/1971 | Espe | 307/235 |
| 3,769,592 | 10/1973 | Espe | 325/478 |
| 3,949,301 | 4/1976 | Mattei | 455/214 X |
| 4,132,953 | 1/1979 | Martin, III | 325/478 |
| 4,139,851 | 2/1979 | Risko | 343/17.6 |
| 4,157,509 | 6/1979 | Zielinski | 375/76 X |
| 4,606,052 | 8/1986 | Hirzel et al. | 375/87 |
| 4,823,360 | 4/1989 | Tremblay et al. | 375/4 |
| 4,852,126 | 7/1989 | Tanaka et al. | 375/76 |

OTHER PUBLICATIONS

Texas Instruments Data Sheet, "SN75ALS085 LAN Access Unit Interface Dual Driver/Receiver," D3279, Apr. 1989, pp. 1-16.
Crystal Semiconductor, Data Book vol. 2, Communications IC's, CS83C92C Coaxial Transceiver Interface, Jun. 1990, pp. 7-69 to 7-78.
National Semiconductor Data Communications Local Area Networks UARTs Handbook, DP8392A/NS324-92A Coaxial Transceiver Interface, pp. 1-65 to 1-72.
Advanced Micro Devices, AM2900 Family 1985 Data Book Bipolar Microprocessor Logic and Interface, Am7991A/Am7992A Serial Interface Adapter, pp. 11-37 to 11-42 (Dec. 1983).

Primary Examiner—Curtis Kuntz
Assistant Examiner—Tesfaldet Bocure
Attorney, Agent, or Firm—Arnold, White & Durkee

[57] ABSTRACT

A dynamic threshold data receiver uses a single comparator for both squelch and data detection. The comparator has a high-magnitude threshold when the receiver is squelched and a low-magnitude threshold when the receiver is unsquelched. A squelch signal is provided by squelch control logic responsive to a comparison signal from the comparator. The squelch control logic has an interval timer comparing intervals of the comparison signal to a predetermined duration of time, and the squelch control logic changes the squelch signal from the asserted state to the unasserted state after the interval timer determines that the magnitude of the signal level on the comparator input has exceeded the high-magnitude threshold for at least said predetermined period of time. Preferably the squelch signal is not asserted until two transitions occur in the comparison signal after the high-magnitude threshold has been exceeded for the predetermined period of time, and the squelch signal is reasserted when a transition fails to occur in the comparison signal for a predetermined duration of time. Preferably the comparator is a differential line receiver, and each of the high and low magnitude thresholds has hysteresis.

20 Claims, 7 Drawing Sheets

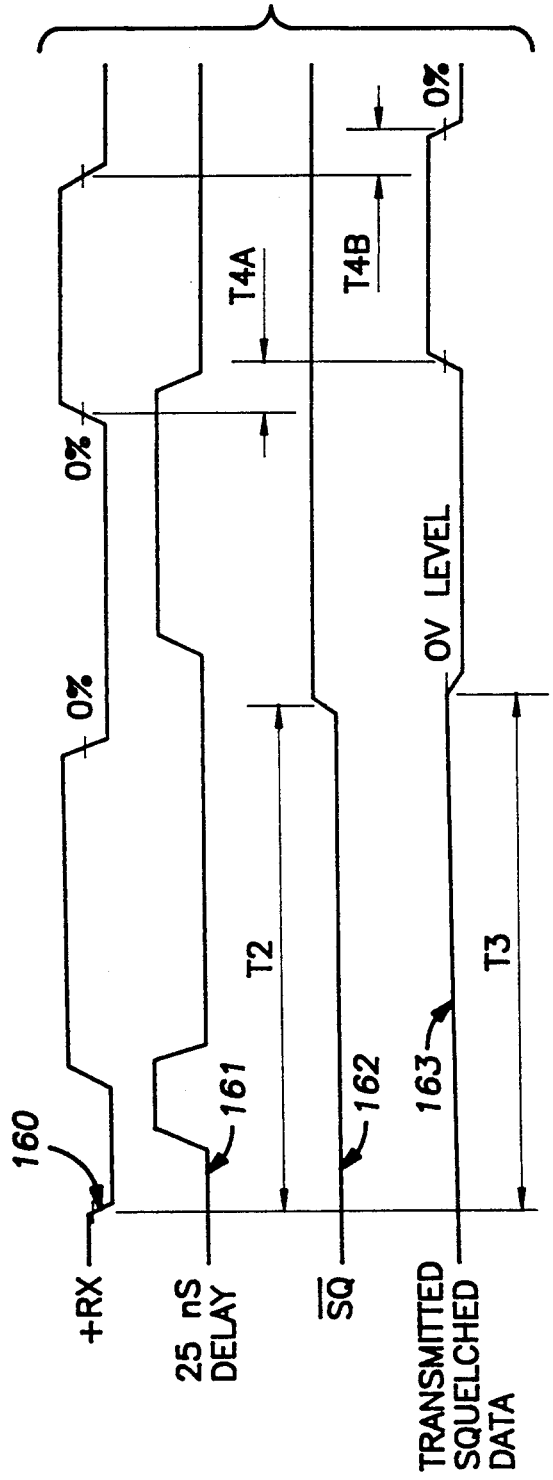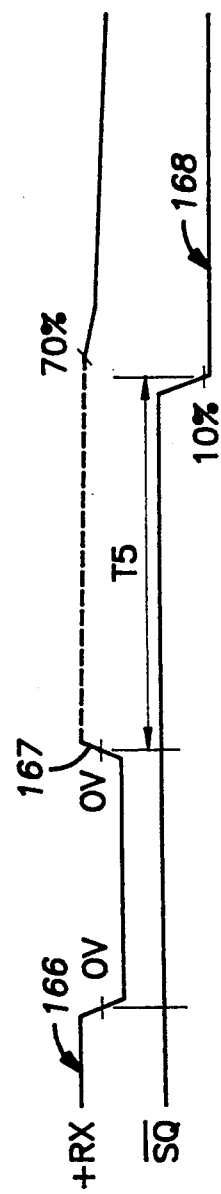

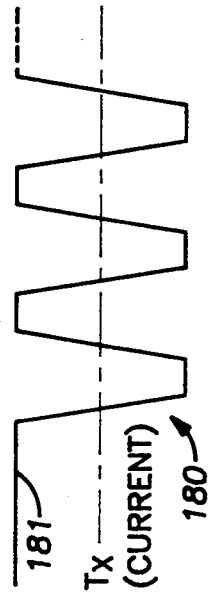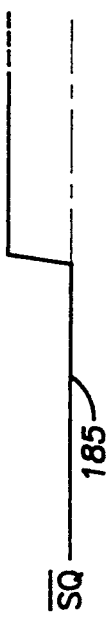
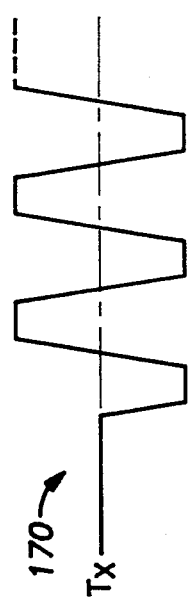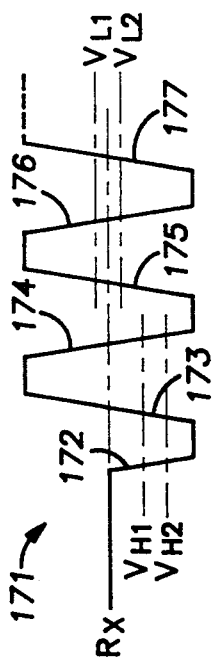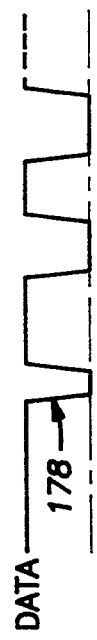

DYNAMIC THRESHOLD DATA RECEIVER FOR LOCAL AREA NETWORKS

BACKGROUND OF THE INVENTION

1. Technical Field

The present invention relates generally to local area networking of data processing devices, and more particularly to short-range data communication over twisted-pair transmission line commonly used in "Ethernet AUI cable." Specifically, the present invention relates to a dynamic threshold data receiver for receiving data transmissions over twisted-pair transmission line in such a local area network.

2. Description of the Related Art

Local area networks of data processing devices typically use coaxial cable for high-speed data transmission In a well-known configuration called an "Ethernet" local area network, a single length of coaxial cable is routed near a number of data processing stations, and the two ends of the cable are terminated with matched loads to prevent reflections. Data are transmitted over the cable at a maximum rate of 10 megabits per second by phase-shift keying a 10 MHz carrier in accordance with Manchester encoding. At each station, the coaxial cable is tapped with at least one coaxial cable interface that receives signals on the cable, and may selectively assert a signal on the cable. The coaxial cable interface is connected to the station equipment via 78 ohm, balance, twisted pair transmission line having a maximum length of 50 meters.

For duplex transmission between each coaxial cable interface and its respective station equipment, a first twisted-pair transmission line is used for transmitting 10 MHz Manchester encoded data from the station equipment to the coaxial cable interface, and a second twisted-pair transmission line is used for transmitting 10 MHz Manchester encoded data from the coaxial cable interface to the station equipment.

It is possible for "collisions" to occur between signals asserted on the coaxial cable by different coaxial transceiver interfaces. The likelihood of such collisions is reduced by a transmission protocol wherein station equipment having a message to be transmitted first checks for the presence of an existing message on the coaxial cable, and when an existing message is found, delays transmission until a predetermined duration of time after the end of the existing message. The integrity of data contained in the messages is protected from collisions by parity checks, redundancy codes, and acknowledgement protocols. To increase message throughput and decrease the likelihood of network "blocking", however, each coaxial transceiver interface checks for excessive signal levels on the cable which are characteristic of a collision. When a collision is detected, the coaxial transceiver interface sends a collision signal to its respective station equipment over a third twisted-pair transmission line. Upon receipt of the collision signal, the station equipment may immediately terminate reception or transmission of a current message, and wait for reception or begin retransmission of the current message.

In many cases, a local area network will have a multiplicity of rather autonomous data processing devices that are in close proximity to each other. Each of these data processing devices could have a respective coaxial cable transceiver. Preferably, however, the data processing devices share a single coaxial cable transceiver but are interconnected to the coaxial cable transceiver by separate twisted-pair transmission lines. In this case the coaxial cable transceiver has a single tap, but provides a multiplicity of access unit interfaces (AUIs) to the multiplicity of data processing devices Such a multi-AUI coaxial transceiver interface may substantially reduce the cost of the system, because the circuitry for multiplexing the multiple AUIs to a single coaxial cable tap and detecting local conflicts between the multiple AUIs is less complex than the circuitry for additional coaxial cable drivers, coaxial cable receivers, coaxial cable collision detectors, and hardware required for making additional coaxial cable taps.

In an "Ethernet" local area network, data transmission over the twisted-pair transmission line conforms to the Access Unit Interface (AUI) specifications of the ANSI/IEEE Standard 802.3-1988. A 78 ohm, balanced, terminated twisted-pair transmission line is driven up to a maximum length of 50 meters In an off (idle) state, the lines are maintained at a minimal differential voltage, and, at the same time, remain within a specified common-mode range. In an on (active) state, the differential voltage on the lines o rises to full-amplitude output levels, and the output amplitude is maintained for the remainder of the packet. After the last positive edge of the message packet, the transmission lines are driven at a minimum of 70% of full differential output for a minimum of 200 ns, and the differential output decays down to a minimum level for a reset (idle) condition within 8 $\mu$s. Moreover, the line drivers withstand a set of fault conditions and do not suffer damage due to the faults being applied.

Line receivers for the twisted-pair AUI transmission line typically employ a "receiver squelch" circuit that allows differential receive signals to pass through as long as the input amplitude and pulse duration are greater than a minimum squelch threshold. The input amplitude limit is typically about $-175$ to $-225$ mV, and the negative-going pulses are rejected unless their pulse duration exceeds about 16 to 20 ns. The line receiver squelch typically becomes active within 50 ns after the squelch threshold is exceeded.

Integrated circuits especially designed for constructing local area networks are available from a number of manufacturers All of the transceiver electronics for a single-AUI coaxial transceiver interface have been placed on a single integrated circuit. Such a single-chip coaxial transceiver interface is sold by National Semiconductor as part No. DP8392A/NS32492A, and by Crystal Semiconductor Corporation as part No. CS83C92C. Each of these integrated circuits includes a single AUI twisted-pair transmission line receiver with a squelch circuit. For constructing multi AUI interfaces, Texas Instruments sells a dual-channel AUI driver/receiver low-power Schottky integrated circuit as part No. SN75ALS085. For use in station equipment, Advanced Micro Devices sells a part No. Am79-91A/Am7992A Serial Interface Adapter including a data receiver, receiver squelch circuit, Manchester decoder, collision signal receiver, transmitter oscillator and Manchester encoder, and a data driver.

A multi-AUI coaxial transceiver interface has been manufactured and sold by Digital Equipment Corporation. The multi-AUI coaxial transceiver uses a multiplicity of integrated circuits, including a plurality of the TI SN75ALS085, interconnected on a printed wiring board. Although it would be desirable to reduce the number of integrated circuit chips in such a system, the line receivers in the TI SN75ALS085 require considerable area on an integrated circuit and consume a fair amount of power because each line receiver includes a differential data receiver and a differential squelch receiver. A logic diagram for the TI SN75ALS085, for example, is shown on page 3 of the Texas Instrument's data sheets, "SN75ALS085 LAN ACCESS UNIT INTERFACE DUAL DRIVER/RECEIVER," D3279, April 1989.

SUMMARY OF THE INVENTION

Accordingly, the present invention provides a dynamic threshold data receiver that uses a single comparator for both squelch and data detection. The comparator has a data signal input line, a threshold control line, and an output line providing a comparison signal. The comparison signal indicates a comparison of signal level on the input line to a threshold. The threshold is set to a high magnitude when a squelch signal is asserted on the threshold control line, and the threshold is set to a low magnitude when the squelch signal is not asserted on the threshold control line. The squelch signal is provided by squelch control logic responsive to the comparison signal. The squelch control logic has an interval timer responsive to the comparison signal for comparing intervals of the comparator signal to a predetermined period of time. The squelch control logic also has state logic for asserting the squelch signal and changing the squelch signal from an asserted state to an unasserted state after the interval timer determines that the comparison signal has indicated that the magnitude of the signal level on the input line has exceeded the high magnitude for at least the predetermined period of time.

In a preferred embodiment, the squelch control logic has a first state in which the squelch signal is asserted, a second state in which the squelch signal is asserted and which is reached from the initial state when the interval timer determines that the magnitude of the signal level on the input line has exceeding the high magnitude for at least the predetermined period of time, a third state in which the squelch signal is asserted and which is reached from the second state when the comparison signal indicates that the magnitude of the signal level on the input line falls below the high magnitude, and a fourth state in which the squelch control signal is asserted and which is reached from the third state when the comparison signal indicates that the magnitude of the signal level on the input line exceeds the high magnitude once again. The initial state is reached from any of the other states when the indication of the comparison signal fails to change for a predetermined duration of time, as determined by an activity timer. The second and third states improve reception of data signals from a full-step driver when the driver is transformer-coupled to the data input line.

In a preferred embodiment, the comparator is a differential line receiver that has hysteresis providing two high magnitude thresholds and two low magnitude thresholds. The hysteresis, in combination with the activity timer of the squelch circuit, permits the differential line receiver to properly terminate message reception during disconnection and faulty line conditions.

BRIEF DESCRIPTION OF THE DRAWINGS

Other objects and advantages of the invention will become apparent upon reading the following detailed description and upon reference to the drawings in which:

FIG. 9A is a timing diagram illustrating the operation of the dynamic threshold data receiver of FIG. 3 during a beginning portion of a message;

FIG. 9B is a timing diagram illustrating the operation of the dynamic threshold data receiver of FIG. 3 at an end portion of a message;

FIG. 10A is a timing diagram of a beginning portion of a message as transmitted over a twisted-pair AUI transmission line by a half-step or tri-state driver;

FIG. 10B is a timing diagram of the beginning portion of the message of FIG. 10A as received by the differential line receiver in the dynamic threshold data receiver of FIG. 3;

FIG. 10C is a timing diagram of the beginning portion of the message of FIG. 10A after passing through th differential line receiver in the dynamic threshold data receiver of FIG. 3;

FIG. 10D is a timing diagram of a squelch signal as generated in response to the beginning portion of the message of FIG. 10A;

FIG. 11A is a timing diagram of the beginning portion of a message as transmitted over a twisted-pair AUI transmission line by a "full-step" driver;

FIG. 11B is a timing diagram of the beginning portion of the message of FIG. 11A as received by the differential line receiver in the dynamic threshold data receiver of FIG. 3;

FIG. 11C is a timing diagram of the beginning portion of the message of FIG. 11A after passing through the differential line receiver in the dynamic data receiver of FIG. 3; and FIG. 11D is a timing diagram of a squelch signal generated in response to the beginning portion of the message of FIG. 11B.

Figure 1:
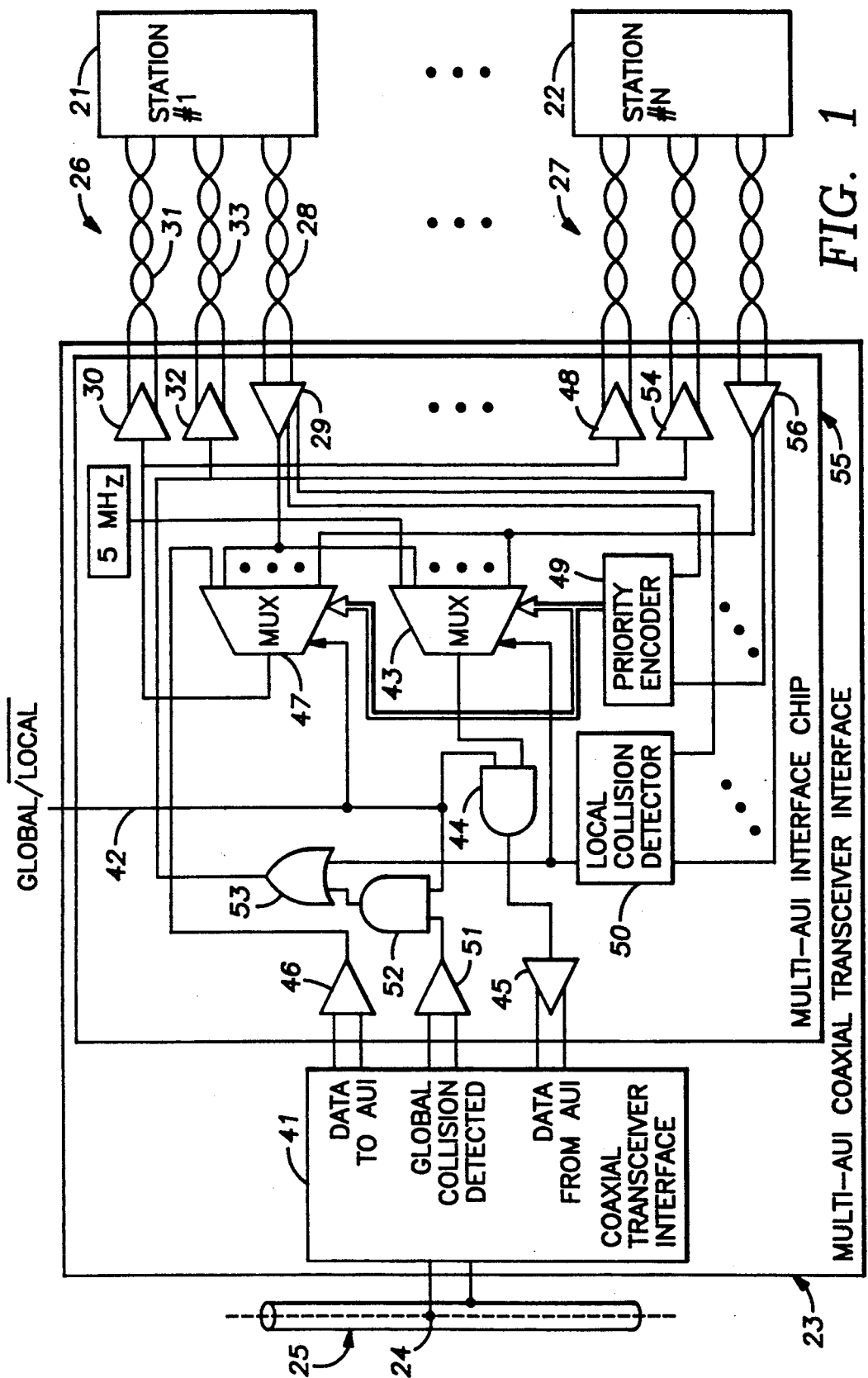
FIG. 1 is a block diagram of a multi-AUI coaxial transceiver interface that employs a number of dynamic threshold data receivers in accordance with the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

DESCRIPTION OF THE PREFERRED EMBODIMENT

Turning now to FIG. 1, there is shown a schematic diagram of a portion of a local area network including a number of stations 21, 22 interconnected by a multi-AUI coaxial transceiver interface 23 to a single tap 24 on a coaxial cable 25. The coaxial cable 25, for example, extends to a number of similar stations to make up what is known as an "Ethernet" local area network.

As shown in FIG. 1, each of the stations 21, 22 is interconnected to the multi-AUI interface 23 by sets of twisted-pair transmission lines 26, 27 which may extend up to 45 meters in length. Data transmission over the twisted-pair transmission lines 26, 27 conforms to the Access Unit Interface (AUI) specifications of the ANSI/IEEE Standard 802.3-1988, as will be more fully described below in connection with FIGS. 9A and 9B. The first station 21, for example, transmits data across a first twisted-pair transmission line 28 to a respective data receiver 29 in the multi-AUI coaxial transceiver interface 23. Data from the multi-AUI coaxial transceiver interface 23 is transmitted by a data transmitter 30 over a twisted-pair transmission line 31 back to the first station 21.

It is possible for a collision to occur between messages in the multi-AUI coaxial transceiver interface 23 or between messages transmitted over the coaxial cable 25. When such a collision is detected, a collision transmitter 32 in the multi-AUI coaxial transceiver interface 23 transmits a signal over a third twisted-pair transmission line 33 to the station 21.

The multi-AUI coaxial transceiver interface 23 includes a conventional coaxial transceiver interface 41 of the kind used to interconnect a single station to a single tap 24 on the coaxial cable 25. The coaxial transceiver interface 41, for example, is a single integrated circuit such part number DP8392A/NS32492A manufactured and sold by National Semiconductor, or part number CS83C92C manufactured and sold by Crystal Semiconductor Corporation of Austin, Tex.

To interface a number of the stations 21, 22 to the coaxial cable 25, the coaxial cable could have a respective tap for each of the stations, and each of the stations could be interfaced to its respective tap through a respective coaxial transceiver interface integrated circuit such as the integrated circuit 41 shown in FIG. 1. Due to relative complexity of the coaxial transceiver interface integrated circuit 41, however, it is more economical to use the multi-AUI configuration shown in FIG. 1 so long as a multiplicity of stations are within a radius of 45 meters from a single tap point 24 on the coaxial cable 25.

The multi-AUI coaxial transceiver interface 23 may operate in either a "global" mode or a "local" mode, as selected by a logic signal on a control line 42. In the "global" mode, a message packet transmitted from one of the stations 21 is received by the data receiver 29 and routed through a multiplexer 43 and a gate 44 to a data transmitter 45 and is transmitted to the coaxial transceiver interface 41. The message packet is received by the coaxial transceiver interface 41, and asserted on the coaxial cable 25. Moreover, the message packet asserted on the coaxial cable is echoed by the coaxial transceiver interface 41, received on a data receiver 46, routed through a multiplexer 47, and transmitted to the stations 21, 22 by transmitters 30, 48.

In the "local" mode, a message packet from one of the stations 21 is received by the data receiver 29, and routed through the multiplexer 47 to the transmitters 30, 48 to all of the stations 21, 22. Select signals for the multiplexer 47 are provided by a conventional priority encoder 49.

Figure 2:
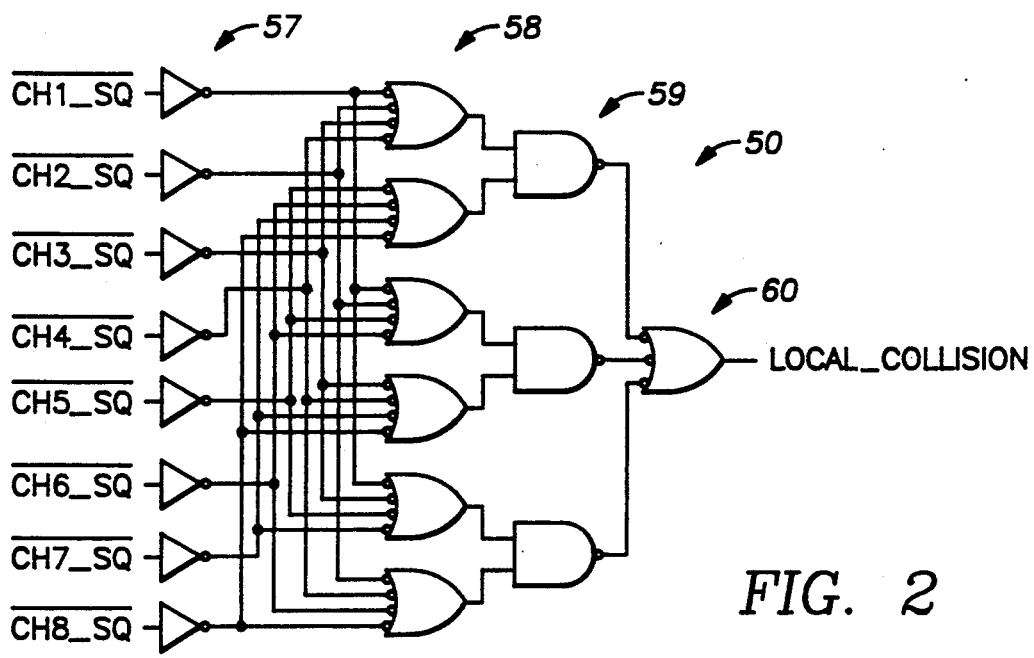
FIG. 2 is a schematic diagram of a local collision detector used in the multi-AUI coaxial transceiver interface of FIG. 1.

In both the "global" mode and the "local" mode, a local collision detector 50 detects any simultaneous transmissions by more than one of the stations 21, 22. A local collision detector 50 for a system having eight stations is shown in FIG. 2. The local collision detector 50 is a combinational logic circuit including a first level of invertors 57, a second level of 4-input NAND gates 58, a third level of 2-input NAND gates 59, and a forth level 60 including a single 3-input NAND gate. The output of the NAND gate 60 is asserted when squelch signals (CH1_SQ, CH2_SQ, . . . , CH8_SQ) from two or more channels are simultaneously unasserted.

Returning now to FIG. 1, in the "global" mode, any global collision signal from the coaxial transceiver interface 41 is received by a line receiver 51, passes through a gate 52, is combined in an OR-gate 53 with any local collision signal from the local collision detector, and is transmitted by the collision signal transmitters 32, 54 to the stations 21, 22. Moreover, in the global mode, when the local collision detector 45 detects a local collision, the multiplexer 43 selects a 5 megahertz signal to be transmitted through the gate 44 to the coaxial transceiver interface 41. In the "local" mode, the gate 52 is inhibited from passing any global collision signal from the coaxial transceiver interface 41 to the stations 21, 22.

As introduced above, it would be desirable to construct the multi-AUI coaxial transceiver interface 23 from a conventional coaxial transceiver interface integrated circuit 41 and a multi-AUI interface integrated circuit 55. A problem associated with the fabrication of such a multi-AUI interface integrated circuit 41, however, is the large number of data receivers on the chip, such as the receivers 29, 46, 51, and 56. As introduced above, typical line receivers such as the line receivers used in the TI SN75ALS085 integrated circuit require considerable area on the integrated circuit chip and consume a fair amount of power because and each receiver includes a differential data receiver and a differential squelch receiver. It is desired, for example, to manufacture the multi-AUI interface chip 55 so that it may interface up to eight stations to a single coaxial transceiver interface 41. Therefore, the AUI concentrator chip 55 must include ten line receivers, which makes the size and power consumption of each line receiver an important factor in the economics of manufacturing the chip 55.

Figure 3:
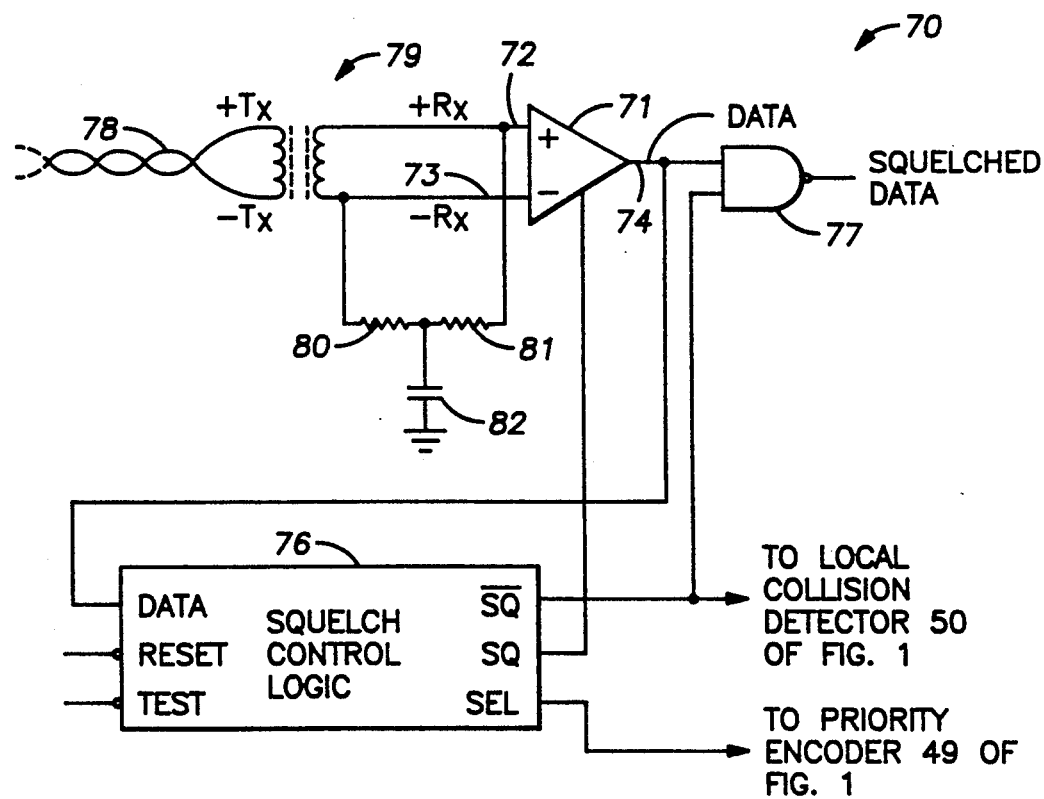
FIG. 3 is a schematic diagram of a dynamic threshold data receiver in accordance with the present invention.

In accordance with the present invention, there is provided a dynamic threshold data receiver that uses a single comparator for both squelch and data detection. A preferred embodiment of the dynamic threshold data receiver of the present invention is shown in FIG. 3. The dynamic threshold data receiver 70 includes a comparator 71 having differential data signal input lines 72, 73, and an output line 74 providing a comparison signal (DATA) indicating a comparison of differential signal level on the input lines 72, 73 to at least one high magnitude differential threshold when a squelch signal on a control line 75 is in an asserted state, and indicating a comparison of differential signal level on the input lines 72, 73 to at least one low magnitude differential threshold when the squelch signal is in an unasserted state. The squelch signal (SQ) is provided by squelch control logic 76 responsive to the comparison signal (DATA). An AND gate 77 gates the comparison signal (DATA) with the squelch-complement signal to provide a squelched data signal.

In the usual case in which the twisted-pair AUI transmission line 78 has a length in excess of a few meters or when the transmitting station (not shown) connected to the transmission line 78 has a power supply (not shown) independent of the power supply (not shown) for the dynamic threshold receiver 70, then the transmission line 78 should be coupled to the input lines 72, 73 of the differential comparator 71 by an isolation transformer 79. The transformer 79 should provide a flat band-pass response over the frequency range of the data signals transmitted over the transmission line 78. For Manchester encoded data at a rate of ten megabits per second, for example, the information signals are primarily concentrated in the range of from five megahertz to ten megahertz, although the band-pass of the transformer 79 should be somewhat greater to minimize intersymbol interference caused by band limiting. In practice, the band width of the transformer 79 is dictated by balancing the effects of intersymbol interference, which favors a wide band width, and noise rejection, which favors a narrow band width. As further described below with reference to FIGS. 10A to 11D, the low-frequency cut-off of the pass band should be rather high when the line transmitter (not shown) uses a full-step driver instead of the preferred tri-state driver. When the line transmitter (not shown) uses a full-step driver, for example, the transformer 79 should have a low-frequency time constant of about 400 nanoseconds, which is the duration of about two data bits. For a standard AUI twisted-pair transmission line impedance of 68 ohms, the transformer in this case should have a mutual inductance of about 30 microhenrys. When the line transmitter (not shown) incorporates the preferred tri-state line driver, however, the time constant of the transformer 79 should be about 1 microsecond, and the transformer should have a mutual inductance of about 75 microhenrys.

To reduce interference due to reflections at the ends of the transmission line 78, the receiver end of the transmission line 78 should be terminated in balanced fashion with a matching impedance provided by resistors 80, 81. Moreover, common-mode noise is suppressed by a shunt capacitor 82. The resistors 80, 81, for example, each have a value of 39 ohms, and the capacitor has a value of 0.1 microfarads.

Figure 4:
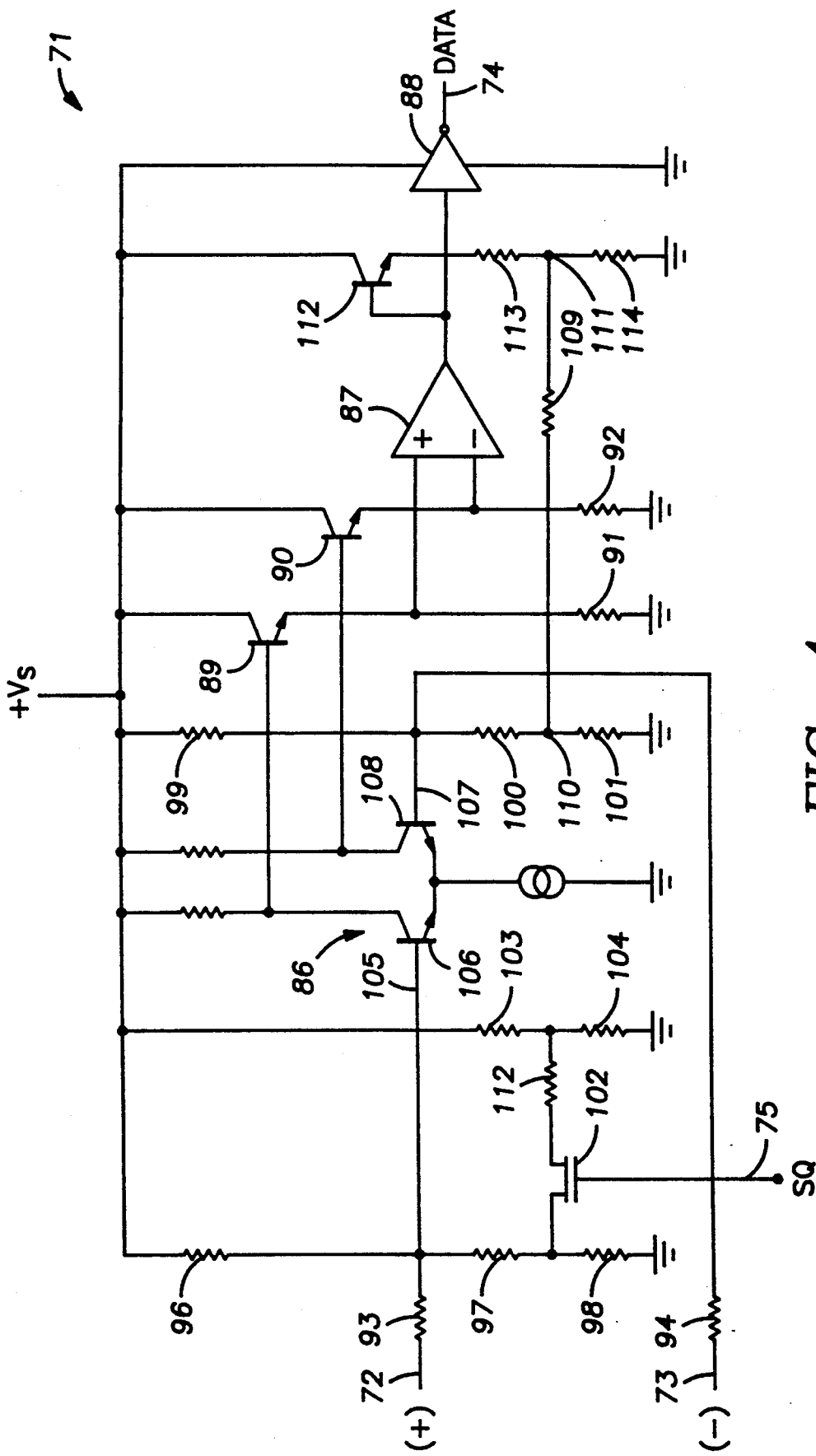
FIG. 4 is a schematic diagram of a variable threshold differential line receiver used in the data receiver of FIG. 3.

Turning now to FIG. 4, there is shown a schematic diagram of the differential comparator 71. The comparator includes a first emitter-coupled differential amplifier 86, a second emitter-coupled differential amplifier 87, and a CMOS inverting buffer 88. The first differential amplifier 86 is interconnected to the second differential amplifier 87 by emitter followers including transistors 89, 90 and load resistors 91 and 92. It should be apparent that the combination of the differential amplifier 86 and emitter followers 89 and 90 has the configuration of a conventional emitter-coupled logic invertor. In a similar fashion, the differential amplifier 87 and the CMOS inverting driver 88 have the conventional construction of a CMOS invertor interfaced to an ECL invertor. Therefore, the differential comparator 71 is easily integrated by using the well-known BI-CMOS process used by Texas Instruments, and other integrated circuit manufacturers.

For use as a differential line receiver, the differential amplifier 86 is provided with series input resistors 93, 94 and bias resistors 96, 97, 98, 99, 100, and 101. In this regard, the circuitry between the input terminals 72, 73 and the differential amplifier 86 is similar to the circuitry used in the Texas Instruments integrated circuit part number SN75ALS085 as shown on page 4 of the above referenced Texas Instruments data sheets number D3279 (April, 1989). The resistors, for example, have the following component values: four K ohms for resistors 93, 94, 96 and 99; three K ohms for resistor 97; four K ohms for resistor 98; and four K ohms for the sum of the resistances of resistors 100 and 101.

For providing an adjustable threshold, the differential comparator 71 has a switching device 102 such as an NMOS transistor selectively connecting a source of bias voltage to one input of the differential amplifier 86. The value of the bias voltage is selected in accordance with the values of the source resistance 104 and the resistors 93, 96, 97 and 98 so that by asserting a threshold control signal on the control line 75 the bias potential on the base 105 of the transistor 106 in the differential amplifier 86 is increased by about 75 millivolts with respect to the bias on the base 107 of the other transistor 108 in the differential amplifier 86. This voltage offset shifts the threshold of the differential amplifier 86 from zero volts to about minus 225 millivolts for the positive input terminal 72 with respect to the negative input terminal 73 of the differential comparator 71. The bias voltage, for example, is supplied by a voltage divider network including resistors 103, 104 and 112. The resistors 103 and 104, for example, have values of 3 K ohms and 1 K ohms, respectively, and the value of resistor 112 is selected to provide the desired value of bias shift when the transistor 102 is switched on. For a 5 volt supply voltage Vs, for example, the resistor 112 has a value of about 3 K ohms.

The differential comparator 71 is also provided with about plus and minus 40 millivolts of hysteresis at each of the zero and 225 millivolt thresholds selected by the SQ signal on the control line 75. The hysteresis is provided by positive feedback from the output of the differential amplifier 87 to the differential amplifier 86. The feedback path includes an emitter follower transistor 112 having load resistors 113 and 114 in series, and a feedback resistor 109. The values of the resistors 100, 101, 113 and 114 are selected so that the average bias voltage at the tap point 110 is the same as the average bias voltage at the tap point 111, and the value of the resistor 109 is selected in accordance with the values of the other resistors to provide the plus and minus 40 millivolts of hysteresis. The emitter follower 112, for example, provides about plus and minus 1.25 volts, which is attenuated by the resistors 113, 114, 109, 101, 100, 99, and 94 to an approximately plus and minus 13.3 millivolts on the base 107 of the transistor 108. This bias change causes the effective plus and minus 40 millivolt hysteresis with respect to the input lines 72, 73. about 3 K ohms, resistors 101 and 114 each have a value of about 1 K ohm, and the value of resistor 109 is selected for the desired amount of hysteresis, and has a value of about 7.5 K ohms.

Figure 5:
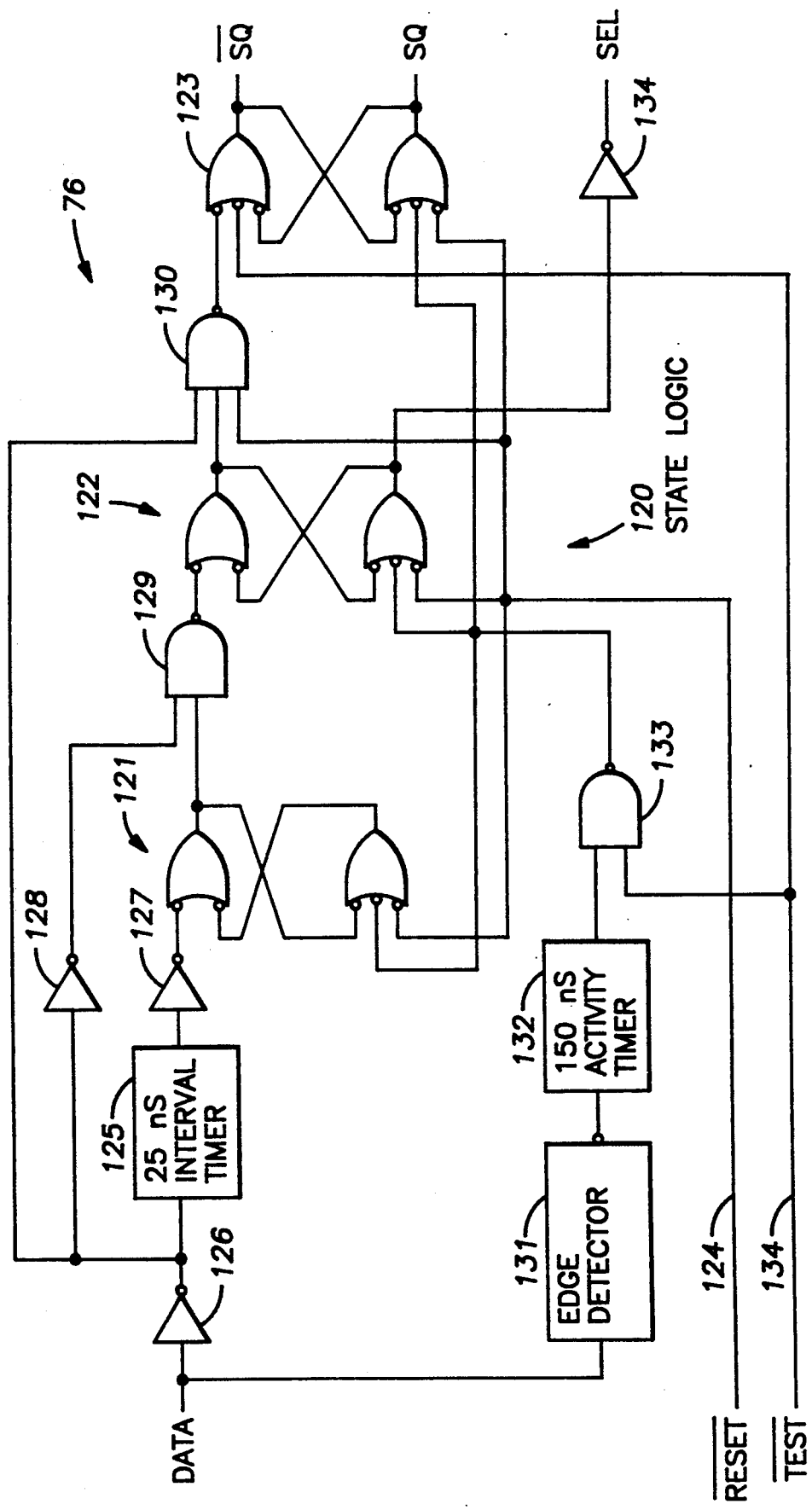
FIG. 5 is a schematic diagram of squelch control logic used in the data receiver of FIG. 3.
Figure 6:
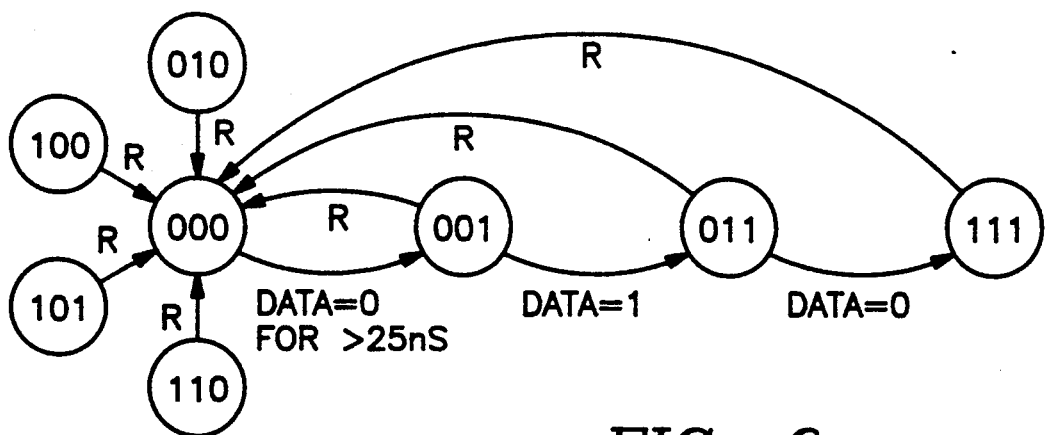
FIG. 6 is a state diagram of the squelch control logic of FIG. 5.

Turning now to FIG. 5, there is shown a schematic diagram of the preferred construction for the squelch control logic 76. To define four states during normal operation, the squelch control logic 76 includes state logic 120 comprised of three set-reset flip-flops generally designated 121, 122, and 123. These three flip-flops define eight possible states, as shown in the state diagram of FIG. 6. Initially, the flip-flops are reset to the state 000 by a signal on a reset line 124. During normal operation of the squelch control logic 76, however, the control logic successively switches between the initial state 000, a second state 001 in which only the first flip-flop 121 is in a set state, a third state 011 in which the first and second flip-flops 121, 122 are in set states, and a fourth state 111 in which all three of the flip-flops 121, 122 and 123 are in a set state. The squelch signal is provided by the state of the third flip-flop 123, and therefore the dynamic threshold data receiver is squelched unless the state 111 is reached.

Assuming that the squelch control logic 76 is in its initial 000 state, upon reception of the beginning of a message packet, the second state 001 is reached when an interval timer 125 (in FIG. 5) determines that the magnitude of the differential signal level on the comparator input lines (72, 73 in FIG. 3) of the comparator (71 in FIG. 3) has exceeded the high magnitude threshold for at least about 25 nanoseconds. As is shown in FIG. 5, the data signal is inverted by an invertor 126, and when the data signal has a duration exceeding 25 nanoseconds, also passes through the interval timer 125 to an invertor 127 and sets the flip-flop 121.

The third state of the squelch control logic 76 is reached from the second state when the comparison signal from the comparator (71 in FIG. 3) indicates that the magnitude of the differential signal level on the comparator input lines (72, 73 in FIG. 3) falls below the high magnitude threshold. In this situation, the comparison signal is applied by an invertor 128 to a NAND gate 129 which sets the second flip-flop 122. The fourth state of the squelch control logic 76 is reached from the third state when the comparison signal from the comparator (71 in FIG. 3) indicates that the magnitude of the differential signal level on the comparator input lines 72, 73 exceeds the high magnitude threshold. For this purpose, the comparison signal, as inverted by the invertor 126, is applied to NAND gate 130 which sets the third flip-flop 123.

Once the fourth state 111 is reached, the dynamic threshold data receiver is unsquelched and remains in the fourth state while receiving a message packet. After receiving the end of the message packet, the state of the squelch control logic changes from the fourth 111 to the initial state 000. The end of the message packet is sensed when there is no change in the logic state of the comparison signal from the comparator for a predetermined duration of time which is about 150 nanoseconds. For this purpose, the squelch control logic 76 includes an edge detector 131 which enables a 150 nanosecond activity timer 132. When a transition fails to be present in the data for more than about 150 nanoseconds, then the activity timer 132 asserts a signal to a NAND gate 133 which resets all of the flip-flops 121, 122 and 123. The third flip-flop 123 is also set by a test signal on a line 134 during a test procedure that unsquelches a selected one of a plurality of line receivers of an integrated circuit such as the multi-AUI interface chip 55 in FIG. 1.

The squelch control logic 76 in FIG. 5 provides a select signal from an invertor 134. The select signal indicates when the second flip-flop is set, which occurs during normal operation of the squelch control logic when the state 011 is reached. The select signal precedes the squelch signal in time, and is applied to the priority encoder 49 of FIG. 1. Because the select signal precedes the squelch signal, the multiplexer becomes set up just before the dynamic threshold receiver is unsquelched. This eliminates startup glitches while routing the message through the multi-AUI interface chip 55 of FIG. 1.

Figure 7:
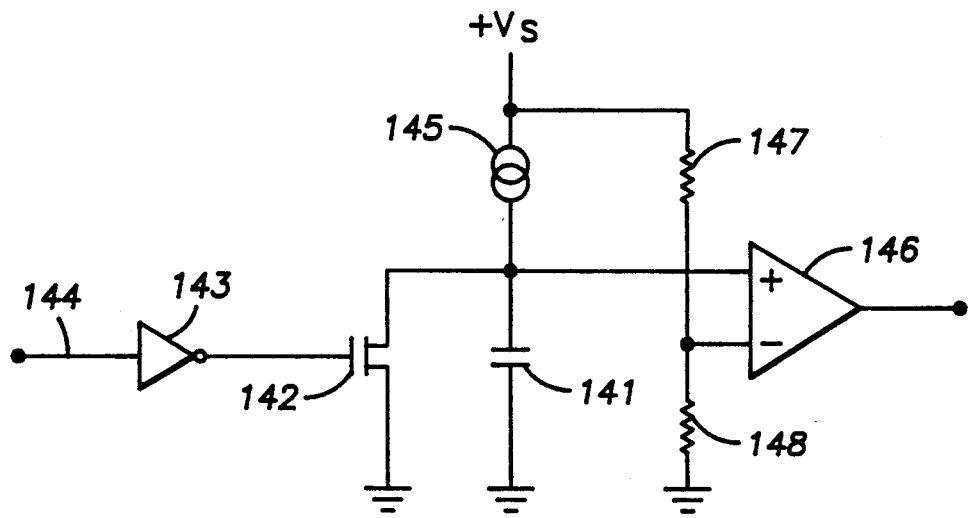
FIG. 7 is a schematic diagram of a timer circuit used in the squelch control logic of FIG. 5.

Turning now to FIG. 7, there is shown a schematic diagram of a timer circuit used for the 25 nanosecond interval timer 125 and the 150 nanosecond activity timer 132 in FIG. 5. To measure the predetermined time interval, a capacitor 141 is initially discharged by an NMOS transistor 142 driven by an invertor 143 in response to an input signal on an input line 144 of the timer circuit. When the input signal is a logic high, then the capacitor 141 is charged at a constant rate by a current source 145. A CMOS comparator 146 compares the voltage on the capacitor 141 to a predetermined threshold, such as half of the supply voltage Vs. The threshold voltage, for example, is provided by a voltage divider including resistors 147 and 148 which each have a value, for example, of about four K ohms. The time delay of the circuit, therefore, is equal to the product of one half of the voltage Vs times the capacitance of the capacitor 141 divided by the current of the current source 145.

Figure 8:
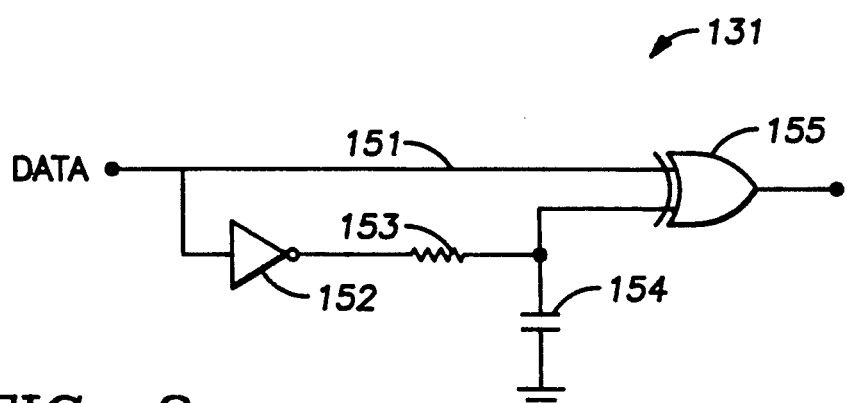
FIG. 8 is a schematic diagram of an edge detector used in the squelch control logic of FIG. 5.

Turning now to FIG. 8, there is shown a schematic diagram of the edge detector 131. The comparison signal (DATA) on an input line 151 is inverted by an invertor 152 and applied to a low-pass filter including a series resistor 153 and a shunt capacitor 154 to provide an inverted and delayed version of the data signal. An exclusive OR gate 155 detects changes between the comparison signal on the line 151 and the inverted and delayed version of the comparison signal on the capacitor 154. In the absence of any transitions in the comparison signal, the exclusive OR gate 155 has an output at a logic high. Otherwise, when a transition occurs in the comparison signal, the output of the exclusive OR gate 155 is a logic low. The comparison signal 151 may transition at up to a 10 megahertz rate. Therefore the RC time constant of the resistor 153 and capacitor 154 should be about 10 nanoseconds so that the exclusive OR gate 155 produces logic low pulses in this case. The resistor 153, for example, has a value of about 4 K ohms and the capacitor 154 has a value of about three picofarads.

Turning now to FIG. 9A there is shown a timing diagram illustrating the response of the dynamic threshold receiver to the beginning portion of a message. The output of the 25 nanosecond interval time (125 in FIG. 5) is illustrated by a waveform 161. The interval time detects when the data signal has a magnitude exceeding the magnitude of the high magnitude threshold for a period of time greater than T1=25 nanoseconds. In accordance with conventional data transmissions over a twisted-pair AUI transmission line, the message packet begins with a negative pulse, and therefore the high magnitude threshold is exceeded when the data signal has a negative value less than a negative value of high magnitude threshold. The receiver becomes unsquelched, as illustrated by the waveform 162, at a time T2 of about 130 nanoseconds to 150 nanoseconds from the beginning of the message packet. Therefore a transmitter is enabled to transmit the squelched data 163 at a time T3 of about 150 nanosecnds to 270 nanoseconds from the beginning of the received message packet. The message should be propagated through the multi-AUI interface chip 55 with a steady state propagation delay T4A of no greater than about 25 nanoseconds. The skew, defined as T4A−T4B, should be a maximum of about two nanoseconds. Moreover, the first transmitted bit cell after the squench deactivates may have bit cell timing errors, but bit cells following the first bit cell should not be distorted.

Turning now to FIG. 9B, there is shown a timing diagram of the end portion 166 of a message packet. The message packet is terminated by a final positive-going transition 167. A conventional AUI message packet must drive the transmission line to at least a 70% value for at least 210 nanoseconds after the final transition 167. Therefore, the end of the message can be detected by the 150 nanosecond activity timer 132. Since the Manchester encoded data in the message packet may have at most about 100 nanoseconds between transitions, the 150 nanosecond delay circuit 132 should have a delay time of between about 144 and 200 nanoseconds. At the end of this delay time, the squelch signal 168 is asserted.

Turning now to FIGS. 10A to 10D, there are shown more detailed timing diagrams that illustrate the thresholds of the threshold comparator that are selected in response to the squelch signal. FIG. 10A illustrates a message packet 170 as transmitted by a tri-state data transmitter (not shown) in the one of the stations 21, 22 in FIG. 1. The received message packet 171, as shown in FIG. 10B, is received by the dynamic threshold receiver (71 in FIG. 3). Initially the squelch signal SQ is asserted, and the threshold comparators (71 in FIG. 3) triggers on a high magnitude threshold $V_{H2}$ at about 265 millivolts during the first negative transition 172 in the message packet. The threshold comparator triggers again during the first positive-going transition 173 at a high magnitude threshold $V_{H1}$ at about 185 millivolts. The comparator transitions during a third, negative going transition 174 at the high-magnitude threshold $V_{H2}$ of about minus 265 millivolts. After this third transition 174, the squelch signal is deasserted, causing the comparator 71 to switch to low magnitude thresholds. During the fourth, positive-going transition 175, the comparator triggers at a threshold $V_{L1}$ of about plus 40 millivolts. During the fifth, negative-going transition 176, the comparator triggers at a threshold $V_{L2}$ of about plus 40 millivolts. During the sixth, positive-going transition 177, the comparator triggers at the threshold $V_{L1}$ of about plus 40 millivolts.

If the line is disconnected or develops an open circuit condition during message transmission, the differential voltage applied to the comparator (71 in FIG. 3) will drop to about zero volts. The hysteresis of about plus and minus 40 millivolts will then cause the data signal to remain stationary, causing a 150 nanosecond timeout of the activity timer, in turn causing the variable threshold receiver to squelch.

Turning now to FIG. 11A, there is shown a beginning portion of the differential line current for a message packet 180 as transmitted by a so-called full-step driver. Between message packets, the full-step driver is driving a DC differential current through the twisted-pair transmission line. The DC current sets up a bias in the isolation transformer (79 in FIG. 3) due to magnetic energy storage. As shown in FIG. 11B, this bias in the isolation transformer causes the voltage of the received message packet 182 to be biased in the negative direction during the beginning portion of the message. In particular, the first positive-going transition 183 of the message just barely becomes positive. The comparator 71, however, properly detects the data signal 184 in this case, as shown in FIG. 11C. Moreover, when the squelch signal 185 is unasserted, the received signal 182 is now more properly biased towards a zero voltage level so that the thresholds of plus and minus 40 millivolts may properly detect the data signal for the remaining portion of the message, beginning with the second positive-going transition 186, as shown in FIG. 11B.

In view of the above, a dynamic threshold data receiver uses a single comparator for both squelch and data detection. The comparator has a high-magnitude threshold when the receiver is squelched and a low-magnitude threshold when the receiver is unsquelched. Each of the high and low magnitude thresholds has hysteresis. The dynamic threshold receiver may use a full-step driver and an isolation transformer, and properly responds to disconnection and line faults that might occur during message transmission. Therefore, the dynamic threshold data receiver may be used as an AUI line receiver and offers decreased size and power supply requirements for facilitating the large-scale circuit integration of a multi-AUI interface chip.

I claim:

1. A method of adjusting the threshold of a comparator for detecting data, said comparator having an input receiving a data signal and an output providing a comparison signal indicating a comparison of signal level on said input to said threshold, said method comprising the steps of:

(a) setting said threshold to a predetermined high magnitude; and then (b) inspecting said comparison signal to determine when said signal level on said input has a magnitude exceeding said high magnitude for a period of time greater than a predetermined period of time; and then (c) after said inspecting of said step (b) determines that said signal level on said input line has a magnitude exceeding said high magnitude for a period of time greater than said predetermined period of time, changing said threshold to a predetermined low magnitude; and then (d) outputting data from said comparison signal when said threshold is set to said low magnitude.

2. The method as claimed in claim 1, further comprising the step of adjusting said threshold in response to said comparison signal to provide hysteresis so that said comparator has hysteresis when said threshold is set to said high magnitude and when said threshold is set to said low magnitude.

3. The method as claimed in claim 1, wherein said step (c) is performed after two transitions occur in said comparison signal after said inspecting of said step (b) determines that said signal level on said input line has a magnitude exceeding said high magnitude for a period of time greater than said predetermined period of time.

4. The method as claimed in claim 1, further comprising the step (e) of changing said threshold from said low magnitude to said high magnitude when said comparison signal fails to change state during a predetermined duration of time.

5. The method as claimed in claim 4, wherein said step (e) further includes terminating the transmitting of data from said comparison signal when said threshold is changed from said low magnitude to said high magnitude.

6. The method as claimed in claim 1, wherein said step (d) of transmitting data includes transmitting said data from said comparison signal to a plurality of data processing devices in a local area network.

7. A dynamic threshold data receiver comprising, in combination:

a comparator having a data signal input line, a threshold control line, and an output line providing a comparison signal, said comparison signal indicating a comparison of signal level on said input line to a threshold, said threshold being set to a high magnitude when a squelch signal is asserted on said threshold control line, and said threshold being set to a low magnitude when said squelch signal is not asserted on said threshold control line; and squelch control logic connected between said output line and said threshold control line, said squelch control logic including an interval timer responsive to said comparison signal for comparing intervals of the comparator signal to a predetermined period of time, and state logic connected to said interval timer for asserting said squelch signal and changing said squelch signal from an asserted state to an unasserted state after said interval timer determines that said comparison signal has indicated that the magnitude of the signal level on the input line has exceeded the high magnitude for at least said predetermined period of time.

8. The dynamic threshold data receiver as claimed in claim 7, further comprising a gate having a first input connected to the output line of said comparator and a second input connected to said state logic for outputting data from said comparator when said squelch signal is not asserted.

9. The dynamic threshold data receiver as claimed in claim 7, wherein said comparator has a positive feedback path providing hysteresis for said threshold when said threshold is set to said high magnitude and when said threshold is set to said low magnitude.

10. The dynamic threshold data receiver as claimed in claim 7, further comprising an edge detector connected to said output line for detecting transitions in said comparison signal, and an activity timer connected to said edge detector for determining when transitions fail to occur in said comparison signal for a time period exceeding a predetermined duration of time, said activity timer having an output connected to said state logic for resetting said state logic to assert said squelch signal when transitions fail to occur in said comparison signal for a time period exceeding said predetermined duration of time.

11. The dynamic threshold data receiver as claimed in claim 7, wherein said state logic defines an initial state in which the squelch signal is in an asserted state, a second state in which the squelch signal is in an asserted state and which is reached from the initial state when the interval timer determines that the magnitude of the signal level on the input line has exceeded said high magnitude for at least said predetermined period of time, a third state in which the squelch signal is asserted and which is reached from the second state when the comparison signal indicates that the magnitude of the signal level on the input line falls below the high magnitude, and a fourth state in which the squelch signal is unasserted and which is reached from the third state when the comparison signal indicates that the magnitude of the signal level on the input line exceeds said high magnitude.

12. The dynamic threshold data receiver as claimed in claim 11, wherein said state logic includes first, second and third set-reset flip-flops defining said initial state, said first state, said second state, said third state, and said fourth state, wherein said flip-flops are reset in said initial state, said first flip-flop is set and said second and third flip-flops are reset in said second state, said first and second flip-flops are set and said third flip-flop is reset in said third state, and said first, second and third flip-flops are set in said fourth state.

13. A dynamic threshold data receiver comprising, in combination:

a differential comparator having a pair of data signal input lines, a threshold control line, and an output line providing a comparison signal, said comparison signal indicating a comparison of differential signal level between said input lines to a threshold, said threshold being set to a high magnitude when a squelch signal is asserted on said threshold control line, and said threshold being set to a low magnitude when said squelch signal is not asserted on said threshold control line; and squelch control logic connected between said output line and said threshold control line, said squelch control logic including an interval timer responsive to said comparison signal for comparing intervals of the comparison signal to a predetermined period of time; an activity timer responsive to said comparison signal for detecting an absence of changes in said comparison signal over a predetermined duration of time; and state logic connected to said interval timer and said activity timer for changing said squelch signal from an asserted state to an unasserted state after said interval timer determines that said comparison signal has indicated that the magnitude of the signal level on the input line has exceeded the high magnitude for at least said predetermined period of time, and changing said squelch signal from said unasserted state to said asserted state after said activity timer detects an absence of changes in said comparison signal over said predetermined duration of time.

14. The dynamic threshold data receiver as claimed in claim 13, further comprising a gate having a first input connected to the output line of said comparator and a second input connected to said state logic for outputting data from said comparator when said squelch signal is not asserted.

15. The dynamic threshold data receiver as claimed in claim 13, wherein said comparator has a positive feedback path providing hysteresis for said threshold when said threshold is set to said high magnitude and when said threshold is set to said low magnitude.

16. The dynamic threshold data receiver as claimed in claim 13, wherein said state logic defines an initial state in which the squelch signal is in an asserted state, a second state in which the squelch signal is in an asserted state and which is reached from the initial state when the interval timer determines that the magnitude of the signal level on the input line has exceeded said high magnitude for at least said predetermined period of time, a third state in which the squelch signal is asserted and which is reached from the second state when the comparison signal indicates that the magnitude of the signal level on the input line falls below the high magnitude, and a fourth state in which the squelch signal is unasserted and which is reached from the third state when the comparison signal indicates that the magnitude of the signal level on the input line exceeds said high magnitude.

17. The dynamic threshold data receiver as claimed in claim 16, wherein said state logic includes first, second and third set-reset flip-flops defining said initial state, said first state, said second state, said third state, and said fourth state, wherein said flip-flops are reset in said initial state, said first flip-flop is set and said second and third flip-flops are reset in said second state, said first and second flip-flops are set and said third flip-flop is reset in said third state, and said first, second and third flip-flops are set in said fourth state.

18. The dynamic threshold data receiver as claimed in claim 16, further comprising a twisted-pair transmission line and a transformer coupling said twisted-pair transmission line to said first and second inputs of said differential comparator.

19. The dynamic threshold data receiver as claimed in claim 13, wherein said dynamic threshold data receiver is integrated on a single integrated circuit chip with a plurality of similar dynamic threshold data receivers.

20. The dynamic threshold data receiver as claimed in claim 19, wherein said single integrated circuit chip interconnects a plurality of data processing devices in a local area network.

* * * * *

UNITED STATES PATENT AND TRADEMARK OFFICE
CERTIFICATE OF CORRECTION

PATENT NO. : 5,179,577
DATED : January 12, 1993
INVENTOR(S) : Nicholas Ilyadis

It is certified that error appears in the above-indentified patent and that said Letters Patent is hereby corrected as shown below:

Column 1, line 17, after "transmission" add --.--.

Column 2, line 5, after "devices" add --.--.

Column 2, line 23, delete "o".

Column 2, line 54, change "multi AUI" to --multi-AUI--.

Column 4, line 39, change "th" to --the--.

Column 8, line 58, after "73." add --Resistors 100 and 113, for example, each have a value of--.

Column 10, line 49, change "time" to --timer--.

Column 11, line 43, delete "plus" and replace with --minus--.

Signed and Sealed this

Twenty-second Day of March, 1994

*Attest:*

BRUCE LEHMAN

*Attesting Officer*     *Commissioner of Patents and Trademarks*